United States Patent
Sung et al.

(10) Patent No.: US 9,894,384 B2
(45) Date of Patent: Feb. 13, 2018

(54) MULTIVIEW VIDEO SIGNAL ENCODING METHOD AND DECODING METHOD, AND DEVICE THEREFOR

(71) Applicant: LG ELECTRONICS INC., Seoul (KR)

(72) Inventors: Jaewon Sung, Seoul (KR); Sehoon Yea, Seoul (KR); Moonmo Koo, Seoul (KR); Jin Heo, Seoul (KR); Taesup Kim, Seoul (KR); Jiwook Jung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 14/434,282

(22) PCT Filed: Oct. 8, 2013

(86) PCT No.: PCT/KR2013/008982
§ 371 (c)(1),
(2) Date: Apr. 8, 2015

(87) PCT Pub. No.: WO2014/058207
PCT Pub. Date: Apr. 17, 2014

(65) Prior Publication Data
US 2015/0271523 A1    Sep. 24, 2015

Related U.S. Application Data

(60) Provisional application No. 61/710,783, filed on Oct. 8, 2012.

(51) Int. Cl.
*H04N 19/597* (2014.01)
*H04N 19/52* (2014.01)
(Continued)

(52) U.S. Cl.
CPC ......... *H04N 19/597* (2014.11); *H04N 19/196* (2014.11); *H04N 19/463* (2014.11);
(Continued)

(58) Field of Classification Search
CPC .. H04N 19/597; H04N 19/196; H04N 19/463; H04N 19/513; H04N 19/52; H04N 19/521; H04N 19/82
See application file for complete search history.

(56) References Cited

U.S. PATENT DOCUMENTS 9,438,882 B2 * 9/2016 Park .................. H04N 19/50
2008/0238930 A1 * 10/2008 Sekine ................. G06T 15/04
345/582

(Continued)

FOREIGN PATENT DOCUMENTS

KR    10-2007-0000022 A    1/2007
KR    10-2007-0116527 A    12/2007
(Continued)

*Primary Examiner* — Sath V Perungavoor
*Assistant Examiner* — Howard D Brown, Jr.
(74) *Attorney, Agent, or Firm* — Dentons US LLP

(57) ABSTRACT

The video signal decoding method according to the present invention involves acquiring weighting-value predicting data of a neighboring view texture block corresponding to the current view texture block, deriving weighting-value predicting data of the current view texture block by using the weighting-value predicting data of the neighboring view texture block, and subjecting the current view texture block to weighting-value compensation by using the derived weighting-value predicting data.

12 Claims, 9 Drawing Sheets

(51) Int. Cl.
*H04N 19/513* (2014.01)
*H04N 19/196* (2014.01)
*H04N 19/463* (2014.01)
H04N 13/00 (2006.01)
H04N 19/82 (2014.01)

(52) U.S. Cl.
CPC ........... *H04N 19/513* (2014.11); *H04N 19/52* (2014.11); *H04N 19/521* (2014.11); *H04N 19/82* (2014.11)

(56) References Cited

U.S. PATENT DOCUMENTS

| | | | |
|---|---|---|---|
| 2013/0229485 A1* | 9/2013 | Rusanovskyy | H04N 13/0048 348/43 |
| 2014/0098883 A1* | 4/2014 | Hannuksela | H04N 19/597 375/240.16 |
| 2014/0168362 A1* | 6/2014 | Hannuksela | H04N 19/597 348/43 |

FOREIGN PATENT DOCUMENTS

| | | |
|---|---|---|
| KR | 10-2010-0000011 A | 1/2010 |
| KR | 10-2011-0082428 A | 7/2011 |
| WO | 2011-149291 A2 | 10/2011 |

\* cited by examiner

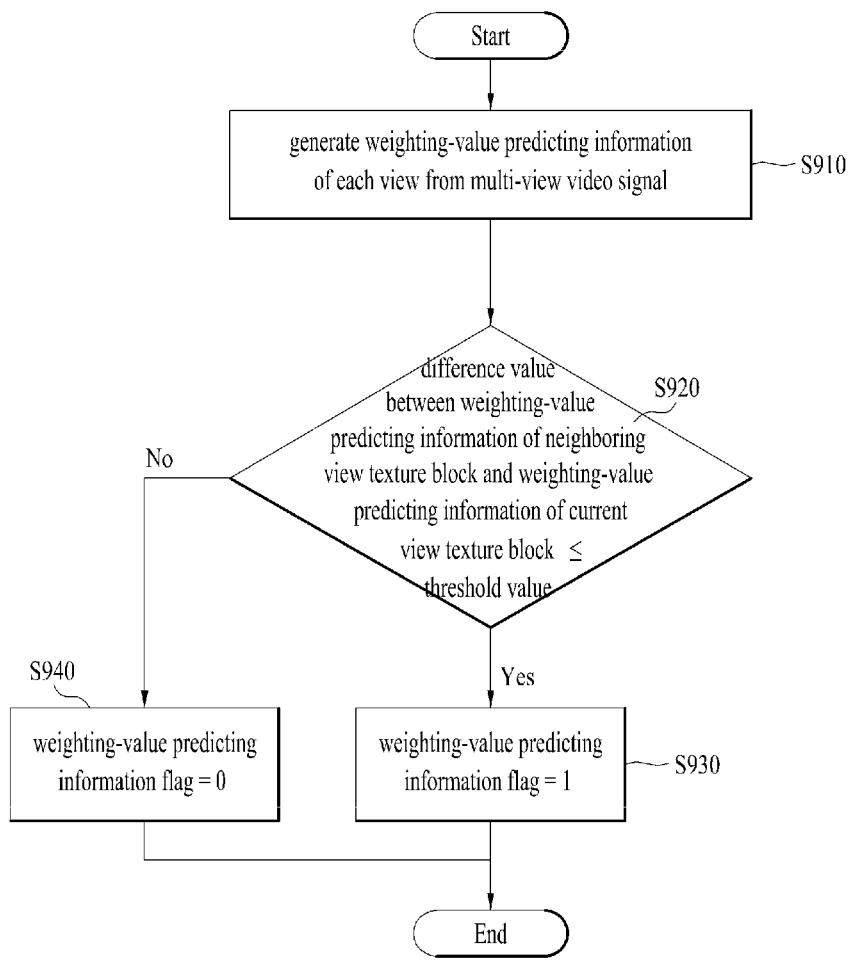

MULTIVIEW VIDEO SIGNAL ENCODING METHOD AND DECODING METHOD, AND DEVICE THEREFOR

This application is a 35 USC § 371 National Stage entry of International Application No. PCT/KR2013/008982 filed on Oct. 8, 2013, which claims priority to U.S. Provisional Application No. 61/710,783, filed on Oct. 8, 2012, all of which are incorporated by reference in their entirety for all purposes as if fully set forth herein.

TECHNICAL FIELD

The present invention relates to a method and device for coding a multiview video signal.

BACKGROUND ART

Compressed encoding refers to a series of signal processing techniques that either transmit digitalized information through a communication line, or store digitalized information in a storage medium in an adequate format. Targets of compression encoding may include audio, video, text, and so on. Most particularly, a technique of performing compression encoding targeting video is referred to as video image compression. The general characteristic of a multiview video image is that a multiview video image carries spatial redundancy, temporal redundancy and inter-view redundancy.

DISCLOSURE

Technical Problem

An object of the present invention is to increase coding efficiency of a video signal.

Technical Solution

The present invention is characterized in that weighting-value predicting information of a current view texture block is derived based on weighting-value predicting information of a neighboring view texture block.

The present invention is characterized in that it is determined whether weighting-value predicting information of a neighboring view texture block is used to derive weighting-value predicting information of a current view texture block, based on a weighting-value predicting information flag.

The present invention is characterized in that weighting-value predicting information of a neighboring view texture block is modified based on an average value and differential average value of pixels of a picture that includes a current view texture block and an average value and differential average value of pixels of a picture that includes a neighboring view texture block, so as to derive weighting-value predicting information of the current view texture block.

Advantageous Effects

According to the present invention, weighting-value predicting information used for weighting-value compensation of a current view texture block is derived based on weighting-value predicting information of a neighboring view texture block without being transmitted separately, whereby the amount of data to be transmitted may be reduced and thus coding efficiency may be improved.

Also, the weighting-value predicting information of the neighboring view texture block is modified considering characteristic of a picture that includes the current view texture block during derivation of the weighting-value predicting information, whereby accuracy of video data prediction may be increased.

Furthermore, as the weighting-value predicting information is acquired for only a partial view block of a multiview block, processing steps are simplified, whereby signal processing complexity of an encoder/decoder may be reduced.

BRIEF DESCRIPTION OF THE DRAWINGS

FIG. 9 is a flow chart illustrating a method for generating weighting-value predicting information according to one embodiment of the present invention.

BEST MODE FOR CARRYING OUT THE INVENTION

Figure 1:
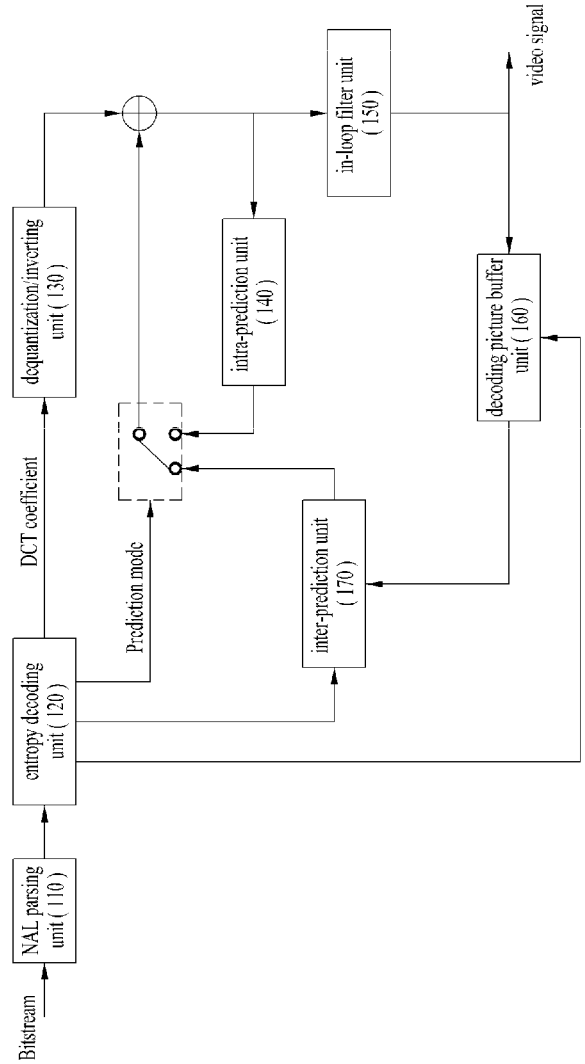
FIG. 1 is a brief block diagram illustrating a video decoder according to one embodiment of the present invention.

A method for decoding a video signal according to one embodiment of the present invention includes the steps of acquiring weighting-value predicting information of a neighboring view texture block corresponding to a current view texture block, deriving weighting-value predicting information of the current view texture block by using the weighting-value predicting information of the neighboring view texture block, and performing weighting-value compensation for the current view texture block by using the derived weighting-value predicting information.

In the meanwhile, a decoding device for decoding a video signal according to one embodiment of the present invention includes a weighting-value predicting information deriving unit acquiring weighting-value predicting information of a neighboring view texture block corresponding to a current view texture block and deriving weighting-value predicting information of the current view texture block by using the weighting-value predicting information of the neighboring view texture block, and a weighting-value compensating unit performing weighting-value compensation for the current view texture block by using the derived weighting-value predicting information.

In the meanwhile, a method for encoding a video signal according to one embodiment of the present invention includes the steps of generating weighting-value predicting information of a current view texture block, generating weighting-value predicting information of a neighboring view texture block, and activating a weighting-value predicting information flag of the current view texture block if a reference block of the neighboring view texture block and a reference block of the current view texture block have the same POC as each other.

In the meanwhile, an encoding device for encoding a video signal according to one embodiment of the present invention includes a weighting-value predicting information generating unit generating weighting-value predicting information of a current view texture block and generating weighting-value predicting information of a neighboring view texture block, and a weighting-value predicting information flag generating unit activating a weighting-value predicting information flag of the current view texture block if a reference block of the neighboring view texture block and a reference block of the current view texture block have the same POC as each other.

Mode for Carrying Out the Invention

Compression encoding or decoding technology for multi-view video signal data considers spatial redundancy, temporal redundancy, and inter-view redundancy. Also, a multi-view texture image taken from two or more views may be coded to implement a 3D display based on a multi-view image. Also, in this specification, coding may include a concept of encoding and decoding, and may be interpreted flexibly in accordance with technical spirits and technical scope of the present invention.

In the meanwhile, in this specification, a current block and a current picture mean a block and a picture, which are desired to be processed (or coded), and a current view means a view desired to be processed. A neighboring view is another view not the current view, and may be a reference view used for inter-view prediction of a multi-view video image and mean a base view or independent view.

In the meanwhile, a texture block of the neighboring view may be specified using an inter-view displacement vector. In this case, the inter-view displacement vector may be used by a method for using an inter-view displacement vector of a neighboring block of a current view texture block and a method for deriving an inter-view displacement vector by using a depth value of a current view texture block.

FIG. 1 is a brief block diagram illustrating a video decoder according to one embodiment of the present invention.

Referring to FIG. 1, the video decoder may include an NAL parsing unit 110, an entropy decoding unit 120, a dequantization/inverting unit 130, an intra-prediction unit 140, an in-loop filter unit 150, a decoding picture buffer unit 160, and an inter-predicting unit 170. The NAL parsing unit 110 may receive bit streams including multi-view texture data.

The NAL parsing unit 110 may perform parsing in a unit of NAL to decode the input bit streams. If the input bit streams are multi-view related data (for example, 3-Dimensional Video), the input bit streams may further include a camera parameter. The camera parameter may be categorized into an intrinsic camera parameter and an extrinsic camera parameter. The intrinsic camera parameter may include a focal length, an aspect ratio, and a principal point, and the extrinsic camera parameter may include location information of the camera in a world coordination system.

The entropy decoding unit 120 may extract transform coefficients quantized through entropy decoding, coding information for prediction of a texture picture, etc.

The dequantization/inverting unit 130 may acquire the transform coefficients by applying a quantization parameter to the quantized transform coefficients and decode texture data by inverting the transform coefficients. In this case, the decoded texture data may include residual data based on prediction processing.

The intra-prediction unit 140 may perform intra-prediction by using restored texture data within the current view texture picture. In this case, coding information used for intra-prediction may include an intra-prediction mode and partition information of intra-prediction.

The in-loop filter unit 150 may apply an in-loop filter to each coded block to reduce block distortion. The filter may improve quality of the decoded picture by smoothing a corner of the block. The filtered texture pictures may be stored in the decoding picture buffer unit 160, whereby the filtered texture pictures may be output or used as reference pictures.

The decoding picture buffer unit 160 serves to store or open texture pictures, which are previously coded, to perform inter-prediction. At this time, to store or open the texture pictures in the decoding picture buffer unit 160, frame_num and picture order count (POC, value indicating output order of pictures) of each picture may be used.

The inter-prediction unit 170 may perform motion compensation of the current block by using a reference picture stored in the decoding picture buffer unit 160 and motion information. In this specification, the motion information may be understood as a broad concept that includes a motion vector, and reference index information. Also, the inter-prediction unit 170 may perform temporal inter-prediction to perform motion compensation. The temporal inter-prediction may mean inter-prediction based on the reference picture located at the same timing point and a different time slot as or from the current view texture block and motion information of the current view texture block. Also, in case of the multi-view image captured by a plurality of cameras, inter-view inter-prediction as well as temporal inter-prediction may further be performed. The inter-view inter-prediction may mean inter-prediction based on the reference picture located at a different timing point from the current view texture block and motion information of the current view texture block.

In the meanwhile, the inter-prediction unit 170 may further include a weighting-value prediction unit to perform weighted prediction, thereby performing weighting-value compensation.

The weighted prediction refers to a coding technique for predicting how a current view texture block becomes darker and brighter than the reference picture located at the same timing point or different time slot as or from the current view texture block during inter-prediction. That is, when an image of which luminance is temporally variable like fade-in (dark image becomes bright gradually) and fade-out (bright image becomes dark gradually) is coded, a weighted value may be given to the reference picture, whereby signal prediction may be performed.

The inter-prediction unit 170 may perform weighting-value compensation for compensating for luminance change of the reference picture and the current texture block by further performing weighted prediction when performing temporal inter-prediction/motion compensation. The detailed description of the weighting-value compensation will be described with reference to FIG. 3.

Figure 2:
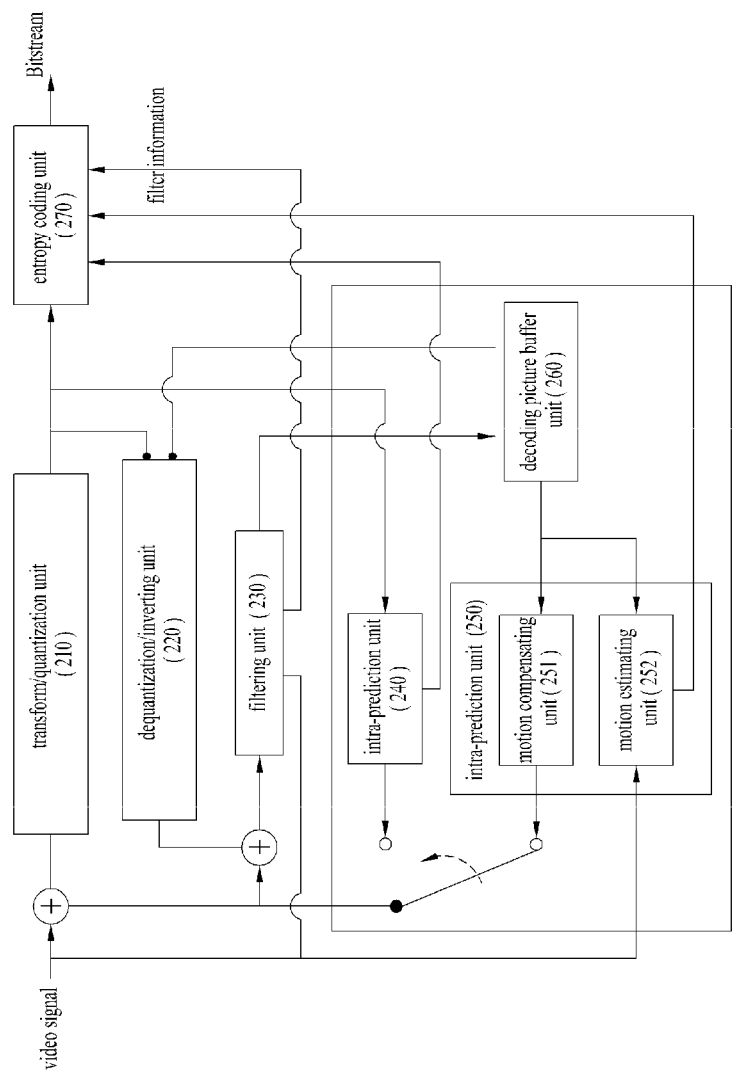
FIG. 2 is a brief block diagram illustrating a video encoder according to one embodiment of the present invention.

FIG. 2 is a brief block diagram illustrating a video encoder according to one embodiment of the present invention.

Referring to FIG. 2, the video encoder may include a transform/quantization unit 210, a dequantization/inverting unit 220, a filtering unit 230, an intra-prediction unit 240, an inter-prediction unit 250, a decoding picture buffer unit 260, and an entropy coding unit 270.

In the transform/quantization unit 210, the transform unit acquires transform coefficients by transforming texture data for an input video signal. As such a transforming method, discrete cosine transform (DCT) or wavelet transform may be used. The quantization unit quantizes the transform coefficient value output from the transform unit.

The dequantization/inverting unit 220 may acquire the transform coefficients by applying a quantized parameter to the quantized transform coefficients and restore texture data by inverting the transform coefficients. In this case, the decoded texture data may include residual data based on prediction processing.

The filtering unit 230 performs filtering operation for improving quality of the restored texture data. The filtered texture pictures may be stored in the decoding picture buffer unit 260, whereby the filtered texture pictures may be output or used as the reference pictures.

The intra-prediction unit 240 may perform intra-prediction by using the restored texture data within the current view texture picture. In this case, coding information used for intra-prediction may include an intra-prediction mode and partition information of intra-prediction.

The inter-prediction unit 250 may perform motion compensation of the current block by using the reference picture stored in the decoding picture buffer unit 160 and motion information. In more detail, the inter-prediction unit 250 may further include a motion compensating unit 251 and a motion estimating unit 252. The motion estimating unit 252 may perform temporal inter-prediction or inter-view inter-prediction by using the reference picture and motion information. The motion compensating unit 251 may perform inter-screen motion compensation by using a motion vector value predicted from the motion estimating unit 252.

In the meanwhile, the inter-prediction unit 250 may further include a weighting-value prediction unit to perform weighted prediction when performing temporal inter-prediction. Weighting-value predicting information of each view, which is generated through weighted prediction, may be transmitted to the decoder. The detailed description of weighting-value prediction will be described with reference to FIG. 4.

Hereinafter, weighting-value prediction in multi-view video signal processing will be described in detail.

Figure 3:
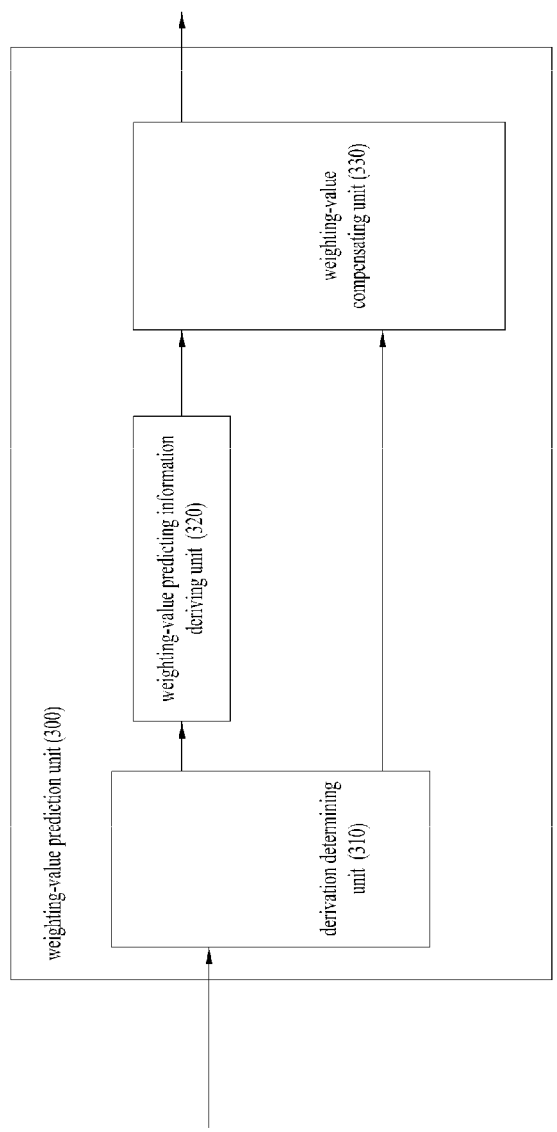
FIG. 3 is a brief schematic diagram illustrating a weighting-value prediction unit according to one embodiment of the present invention.

FIG. 3 is a brief schematic diagram illustrating a weighting-value prediction unit that may be included in the decoder of FIG. 1. Although the weighting-value prediction unit 300 may be included in the inter-prediction unit 170 of FIG. 1, the weighting-value prediction unit 300 may be designed separately.

Referring to FIG. 3, the weighting-value prediction unit 300 may include a derivation determining unit 310, a weighting-value predicting information deriving unit 320, and a weighting-value compensating unit 330.

The derivation determining unit 310 may determine whether to derive weighting-value predicting information of a current view texture block by using weighting-value predicting information of a neighboring view texture block on the basis of a weighting-value predicting information flag of the current view texture block.

In this case, the weighting-value predicting information means weighting-value information for compensating for the current texture block by predicting luminance change of the reference picture and the current texture block. In more detail, the weighting-value predicting information may include a weighting factor and additive offset.

The weighting-value predicting information flag means a flag indicating whether to derive the weighting-value predicting information of the current view texture block from the weighting-value predicting information of the neighboring view texture block or indicating whether to directly acquire the weighting-value predicting information of the current view texture block from the bit streams. For example, if the weighting-value predicting information flag is activated (for example, a flag value is '1'), the derivation determining unit 310 may determine that the weighting-value predicting information of the current view texture block is derived using the weighting-value predicting information of the neighboring view texture block. In contrast, if the weighting-value predicting information flag is deactivated (for example, a flag value is '0'), the derivation determining unit 310 may determine that the weighting-value predicting information of the current view texture block is directly acquired from the bit streams.

Since the weighting-value predicting information includes a plurality of parameters, the weighting-value predicting information flag may display whether to derive each of the plurality of parameters. The weighting-value predicting information flag may be included in a slice header.

In the meanwhile, the derivation determining unit 310 may determine that the weighting-value predicting information of the current view texture block is derived even if the reference picture of the neighboring view texture block and the reference picture of the current view texture block have the same picture of counter (POC) as each other.

If the derivation determining unit 310 may determine that the weighting-value predicting information of the current view texture block is derived, the weighting-value predicting information deriving unit 320 may derive the weighting-value predicting information of the current view texture block by using the weighting-value predicting information of the neighboring view texture block. In more detail, the weighting-value predicting information deriving unit 320 may acquire the weighting-value predicting information of the neighboring view texture block and derive the weighting-value predicting information of the current view texture block by using the acquired weighting-value predicting information.

As methods for deriving the weighting-value predicting information, there are provided a) a method for deriving the weighting-value predicting information of the current view texture block through inheritance of the weighting-value predicting information of the neighboring view texture block as it is, and b) a method for deriving the weighting-value predicting information of the current view texture block by modifying the weighting-value predicting information of the neighboring view texture block.

According to the method a), the weighting-value predicting information of the neighboring view texture block is used as the weighting-value predicting information of the current view texture block by inheritance of the weighting-value predicting information of the neighboring view texture block as it is. The multi-view video image is based on that temporal luminance change is maintained equally or similarly between the respective views.

According to the method b), the weighting-value predicting information is derived considering characteristic of the current view. In more detail, the weighting-value predicting information of the neighboring view texture block is modified based on an average value and differential average value of pixels of a picture that includes the current view texture block and an average value and differential average value of pixels of a picture that includes the neighboring view texture block, so as to derive the weighting-value predicting information of the current view texture block. In this case, the differential average value of the pixels means an average of differential values obtained by subtracting the average value of the pixels from the respective pixel values of the picture.

The detailed method for deriving the weight-value predicting information will be described based on the Equation 1.

$$y = ax + b \quad \text{[Equation 1]}$$

In the Equation 1, x means the weighting-value predicting information of the neighboring view texture block, and y means the derived weighting-value predicting information of the current view texture block. Coefficients of derived functions such as 'a' and 'b' may be extracted from the bit streams through a sequence parameter set, a slice header, etc., and may be information calculated within the decoder. The derived Equation of 'a' and 'b' are defined as the following Equation 2.

$$a = AC_{Curr} / AC_{Ref} \quad \text{[Equation 2]}$$
$$b = DC_{Curr} - a * DC_{Ref}$$
$$DC_{Curr} = \sum_{y=0}^{H-1} \sum_{x=0}^{W-1} I_{Curr}(x, y) / (H * W)$$
$$AC_{Curr} = \sum_{y=0}^{H-1} \sum_{x=0}^{W-1} |I_{Curr}(x, y) - DC_{Curr}| / (H * W)$$
$$DC_{Ref} = \sum_{y=0}^{H-1} \sum_{x=0}^{W-1} I_{Ref}(x, y) / (H * W)$$
$$AC_{Ref} = \sum_{y=0}^{H-1} \sum_{x=0}^{W-1} |I_{Ref}(x, y) - DC_{Ref}| / (H * W)$$

In the Equation 2, H means a height of the picture, W means a width of the picture, and I means a pixel value of the picture. In the Equation 2, DC is a value corresponding to the average value of the pixels of the picture and AC is a value corresponding to the differential average value of the pixels of the picture, and it is noted that the weighting-value predicting information of the current view texture block is derived based on the average value DCcurr and differential average value ACcurr of the pixels of the picture that includes the current view texture block and the average value DCref and differential average value ACref of the pixels of the picture that includes the neighboring view texture block.

The weighting-value compensating unit 330 performs weighting-value compensation by using the weighting-value predicting information of the current view texture block, which is derived from the weighting-value predicting information deriving unit 320, or the weighting-value predicting information acquired from the bit streams. As described above, the weighting-value may adaptively be given to the reference picture based on the weighting-value predicting information, whereby luminance of the current view texture block may be compensated.

Figure 4:
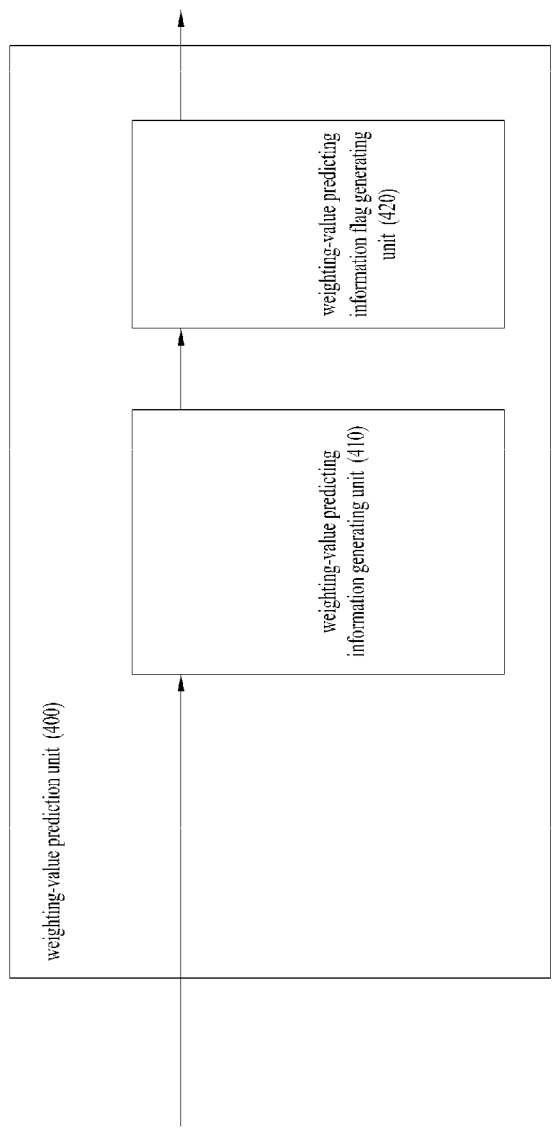
FIG. 4 is a brief schematic diagram illustrating a weighting-value prediction unit according to one embodiment of the present invention.

FIG. 4 is a brief schematic diagram illustrating a weighting-value prediction unit according to one embodiment of the present invention. Although the weighting-value prediction unit 400 may be included in the inter-prediction unit 250 of FIG. 2, the weighting-value prediction unit 400 may be designed separately.

Referring to FIG. 4, the weighting-value prediction unit 400 may include a weighting-value predicting information generating unit 410, and a weighting-value predicting information flag generating unit 420.

The weighting-value predicting information generating unit 410 may generate weighting-value predicting information of each view texture block.

The weighting-value predicting information flag generating unit 420 may activate or deactivate a weighting-value predicting information flag of a current view texture block to be coded. The weighting-value predicting information flag generating unit 420 may activate the weighting-value predicting information flag (for example, set to '1') if the reference pictures of the current view texture block and the neighboring view texture block have the same POC (picture of counter).

Alternatively, the weighting-value predicting information flag generating unit 420 may activate the weighting-value predicting information flag if a difference between the weighting-value predicting information of the current view texture block and the weighting-value predicting information of the neighboring view texture block is within the range of a threshold value.

In the meanwhile, the weighting-value predicting information flag generating unit 420 may perform coding by including the activated or deactivated weighting-value predicting information flag in the slice header.

The weighting-value prediction unit according to one embodiment of the present invention has been described as above. Hereinafter, for convenience of understanding, weighted prediction will be described with reference to FIGS. 5 to 7.

Figure 5:
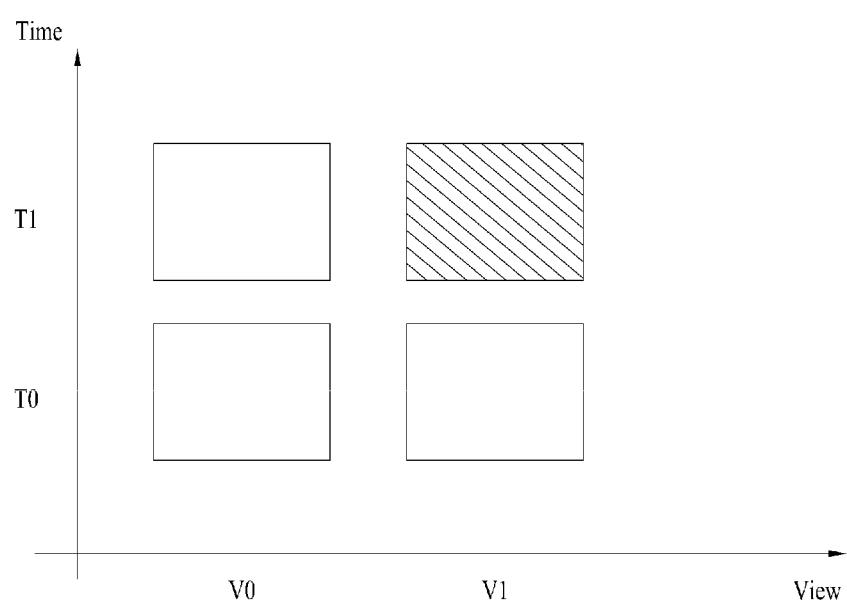
FIG. 5 is a diagram illustrating a method for predicting a weighting-value in a video image having one view.

FIG. 5 is a diagram illustrating a method for predicting a weighting-value in a video image having one view.

Referring to FIG. 5, weighting-value predicting information (WP table, Weighted Prediction table) may be applied to a reference picture of a view T0, which has been already decoded and restored, whereby luminance of a current picture which is currently being processed and corresponds to a view T1 may be compensated.

Figure 6:
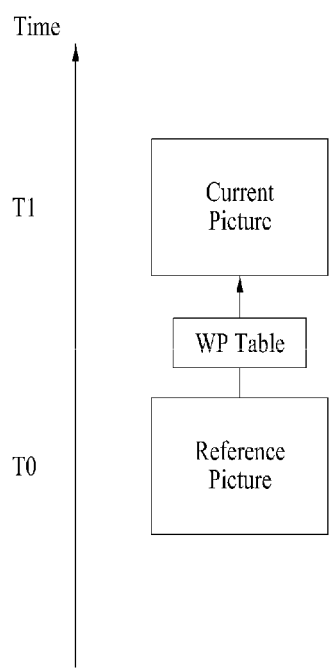
FIGS. 6 and 7 are diagrams illustrating a method for predicting a weighting-value in a multi-view video image.
Figure 7:
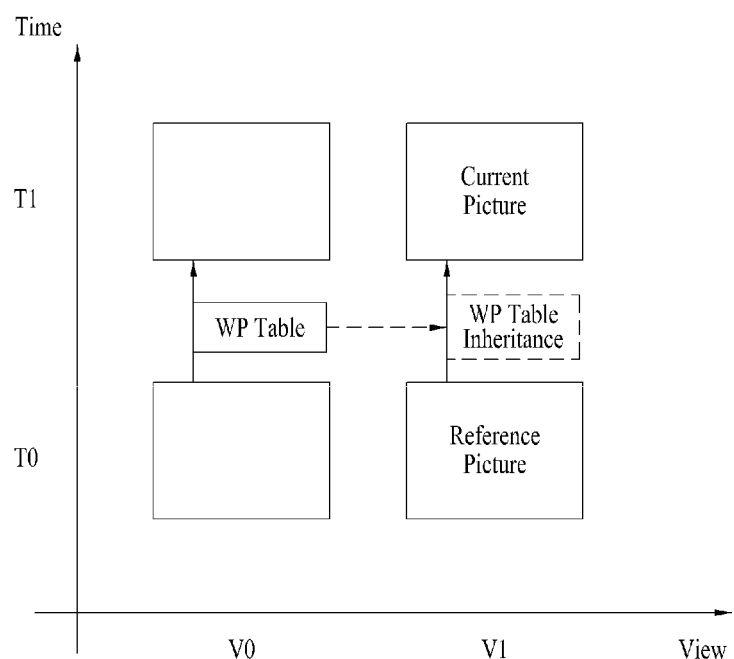

FIGS. 6 and 7 are diagrams illustrating a method for predicting a weighting-value in a multi-view video image.

If a multi-view point video image is coded as shown in FIG. 6, images which are already restored may include images V1 and T0 which correspond to the same view as images V1 and T1 which are being currently coded, and images V0 and T1 which correspond to a different view from the images V1 and T1. The multi-view video image is characterized in that temporal luminance change is maintained equally or similarly between the respective views. Based on the characteristic of the multi-view video image, the weighting-value predicting information (WP table, Weighted Prediction table) of the neighboring view V0 may be used as the weighting-value predicting information (WP table Inheritance) of the current view V1 as shown in FIG. 7. As described above, the weighting-value predicting information of the neighboring view may be used as it is or may be modified, whereby the weighting-value predicting information of the current view may be used.

In the meanwhile, although the method for predicting a weighting-value by using one reference picture has been described with reference to FIGS. 5 to 7, a plurality of reference pictures may be used in accordance with a prediction mode.

Figure 8:
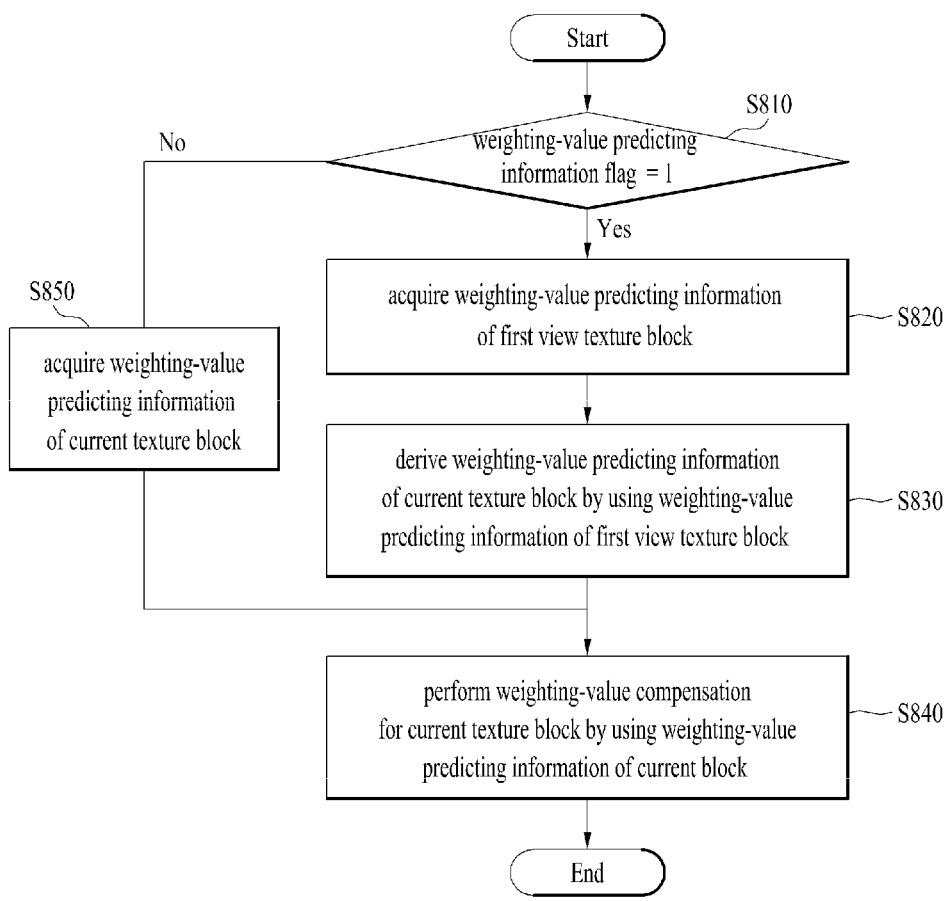
FIG. 8 is a flow chart illustrating a method for deriving weighting-value predicting information according to one embodiment of the present invention.

FIG. 8 is a flow chart illustrating a method for deriving weighting-value predicting information according to one embodiment of the present invention.

Referring to FIG. 8, the decoder according to one embodiment of the present invention may acquire weighting-value predicting information of a neighboring view texture block (S820) if a weighting-value predicting information flag is set to 1 (S810, Yes). And, the decoder may derive weighting-value predicting information of a current view texture block by using the weighting-value predicting information of the neighboring view texture block (S830). In contrast, the decoder may acquire the weighting-value predicting information of the current view texture block (S850) if the weighting-value predicting information flag is set to 0 (S810, No).

And, the decoder may perform weighting-value compensation for the current view texture block by using the weighting-value predicting information of the current view texture block (S860).

The method for deriving weighting-value predicting information, the weighting-value predicting information, and the weighting-value predicting information flag have been described in detail with reference to FIG. 3, and thus their repeated description will be omitted.

FIG. 9 is a flow chart illustrating a method for generating weighting-value predicting information according to one embodiment of the present invention.

An encoder may generate weighting-value predicting information of each view from a multi-view video signal (S910). Also, the encoder may calculate a difference value between weighting-value predicting information of a neighboring view texture block and weighting-value predicting information of a current view texture block, and if the difference value is less than a threshold value (S920, Yes), may set a weighting-value predicting information flag of the current view texture block to 1 (S930). In contrast, if the difference value is not less than a threshold value (S920, No), the encoder may set the weighting-value predicting information flag of the current view texture block to 0 (S940).

In the meanwhile, the encoder may set the weighting-value predicting information flag of the current view texture block to 1 only if the weighting-value predicting information of the neighboring view texture block is the same as the weighting-value predicting information of the current view texture block.

In the meanwhile, the method for setting a weighting-value predicting information flag has been described in detail with reference to FIG. 4, and thus its repeated description will be omitted.

As described above, the decoding/encoding device to which the present invention is applied may be provided in a transmitting/receiving device for multimedia broadcasting such as digital multimedia broadcasting (DMB), and may be used to decode a video signal, a data signal, etc. Also, the transmitting/receiving device for multimedia broadcasting may include a mobile communication terminal.

Furthermore, the decoding/encoding method to which the present invention is applied may be produced as programs for being implemented in a computer and may be stored in a recording medium that can be read by the computer. The multimedia data having the data structure according to the present invention may be stored in the recording medium that can be read by the computer. The recording medium that can be read by the computer includes all kinds of recording media in which data that can be read by the computer system are stored. Examples of the recording medium include a ROM, a RAM, CD-ROM, a magnetic tape, a floppy disk, and an optical data memory. Also, another example of the recording medium may be implemented in a type of carrier wave (for example, transmission through Internet). Also, the bit streams generated by the encoding method may be stored in the recording medium that can be read by the computer, or may be transmitted using wire/wireless communication network.

INDUSTRIAL APPLICABILITY

The present invention may be used to code a video signal.

The invention claimed is:

1. A method for decoding a multi-view video signal by a decoding device, the method comprising:
    acquiring, by the decoding device from the multi-view video signal, a weighted prediction table flag indicating whether a weighted prediction table of a reference view texture block is used for a weighted prediction for a current view texture block;
    acquiring, by the decoding device from the multi-view video signal, the weighted prediction table of the reference view texture block corresponding to the current view texture block;
    deriving, by the decoding device, a weighted prediction table of the current view texture block by using the weighted prediction table of the reference view texture block according to the weighted prediction table flag; and
    performing, by the decoding device, the weighted prediction for the current view texture block by using the derived weighted prediction table.

2. The method according to claim 1, wherein deriving the weighted prediction table of the current view texture block includes deriving the weighted prediction table of the current view texture block only if a reference picture of the reference view texture block and a reference picture of the current view texture block have a same picture of count (POC).

3. The method according to claim 1, wherein the weighted prediction table of the current view texture block is derived by modifying the weighted prediction table of the reference view texture block based on an average value and differential average value of pixels of a picture that includes the current view texture block and an average value and differential average value of pixels of a picture that includes the reference view texture block.

4. The method according to claim 1, wherein the weighted prediction table of the current view texture block is used for compensating for a luminance difference between a reference picture of the current view texture block for inter-prediction and the current view texture block.

5. A decoding device for decoding a multi-view video signal, the decoding device comprising:
    a derivation determining unit acquiring a weighted prediction table flag indicating whether a weighted prediction table of a reference view texture block is used for a weighted prediction for a current view texture block;
    a weighting-value predicting information deriving unit acquiring the weighted prediction table of the reference view texture block corresponding to the current view texture block and deriving a weighted prediction table of the current view texture block by using the weighted prediction table of the reference view texture block according to the weighted prediction table flag; and a weighting-value compensating unit performing the weighted prediction for the current view texture block by using the derived weighted prediction table.

6. The decoding device according to claim 5, wherein the weighting-value predicting information deriving unit derives the weighted prediction table of the current view texture block only if a reference picture of the reference view texture block and a reference picture of the current view texture block have a same picture of count (POC).

7. The decoding device according to claim 5, wherein the weighted prediction table of the current view texture block is derived by modifying the weighted prediction table of the reference view texture block based on an average value and differential average value of pixels of a picture that includes the current view texture block and an average value and differential average value of pixels of a picture that includes the reference view texture block.

8. The decoding device according to claim 5, wherein the weighted prediction table of the current view texture block is used for compensating for a luminance difference between a reference block of the current view texture block for inter-prediction and the current view texture block.

9. A method for encoding a multi-view video signal by an encoding device, the method comprising:
generating, by an encoding device, a weighted prediction table of a current view texture block;
generating, by an encoding device, a weighted prediction table of a reference view texture block; and
activating, by an encoding device, a weighted prediction table flag of the current view texture block if a reference picture of the reference view texture block and a reference picture of the current view texture block have a same picture of count (POC) and a difference value between the weighted prediction table of the reference view texture block and the weighted prediction table of the current view texture block is within a range of a threshold value.

10. An encoding device for encoding a multi-view video signal, the encoding device comprising:
a weighting-value predicting information generating unit generating a weighted prediction table of a current view texture block and generating a weighted prediction table of a reference view texture block; and
a weighting-value predicting information flag generating unit activating a weighted prediction table flag of the current view texture block if a reference picture of the reference view texture block and a reference picture of the current view texture block have a same picture of count (POC) and a difference value between the weighted prediction table of the reference view texture block and the weighted prediction table of the current view texture block is within a range of a threshold value.

11. The method according to claim 1, wherein the weighted prediction table of the reference view texture block is used as the weighted prediction table of the current view texture block.

12. The decoding device according to claim 5, wherein the weighted prediction table of the reference view texture block is used as the weighted prediction table of the current view texture block.

* * * * *